United States Patent
Liu et al.

(10) Patent No.: US 10,103,905 B2
(45) Date of Patent: Oct. 16, 2018

(54) METHOD FOR TRANSMITTING CHANNEL INFORMATION AND WIRELESS COMMUNICATION SYSTEM USING THE SAME

(71) Applicant: INDUSTRIAL TECHNOLOGY RESEARCH INSTITUTE, Hsinchu (TW)

(72) Inventors: Chia-Lung Liu, Zhubei (TW); Dong-Shing Wu, Puli Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 176 days.

(21) Appl. No.: 15/383,620

(22) Filed: Dec. 19, 2016

(65) Prior Publication Data

US 2018/0176042 A1 Jun. 21, 2018

(30) Foreign Application Priority Data

Dec. 16, 2016 (TW) .............................. 105141823 A

(51) Int. Cl.
*H04L 25/02* (2006.01)
*H04B 17/345* (2015.01)
(Continued)

(52) U.S. Cl.
CPC ....... *H04L 25/0224* (2013.01); *H04B 7/0456* (2013.01); *H04B 17/345* (2015.01);
(Continued)

(58) Field of Classification Search
CPC .. H04B 7/0413; H04B 7/0456; H04B 17/345; H04W 72/0413; H04L 25/0224; H04L 5/0048
See application file for complete search history.

(56) References Cited

U.S. PATENT DOCUMENTS

2007/0206691 A1*  9/2007  You ..................... H04L 25/0226
                                                                    375/260
2007/0281624 A1   12/2007  Thomas et al.
(Continued)

FOREIGN PATENT DOCUMENTS

CN   104202272 A   12/2014
CN   105553524 A    5/2016
(Continued)

OTHER PUBLICATIONS

Extended European Search Report for European Application No. 16205368.0, dated Aug. 9, 2017.
(Continued)

*Primary Examiner* — Asad M Nawaz
*Assistant Examiner* — Saad A. Waqas
(74) *Attorney, Agent, or Firm* — Birch, Stewart, Kolasch & Birch, LLP

(57) ABSTRACT

A method for transmitting channel information, adapted to a base station, includes steps of: receiving a first uplink reference signal and a second uplink reference signal from a user device, obtaining an uplink channel estimation value according to the first uplink reference signal, and obtaining a downlink channel estimation value according to the second uplink reference signal and the uplink channel estimation value.

21 Claims, 9 Drawing Sheets

(51) Int. Cl.
  *H04B 7/0456*  (2017.01)
  *H04L 5/00*  (2006.01)
  *H04W 72/04*  (2009.01)
  *H04B 7/0413*  (2017.01)
(52) U.S. Cl.
  CPC ........ *H04L 5/0048* (2013.01); *H04L 25/0228*
    (2013.01); *H04W 72/0413* (2013.01); *H04B*
    *7/0413* (2013.01)

(56) References Cited

U.S. PATENT DOCUMENTS

| | | | | |
|---|---|---|---|---|
| 2010/0008294 | A1* | 1/2010 | Palanki | H04B 7/022 370/328 |
| 2010/0150036 | A1 | 6/2010 | Zheng et al. | |
| 2012/0224499 | A1* | 9/2012 | Yoo | H04J 11/005 370/252 |
| 2014/0087735 | A1* | 3/2014 | Vikberg | H04W 36/0055 455/436 |
| 2014/0241293 | A1 | 8/2014 | Luo et al. | |
| 2014/0314011 | A1* | 10/2014 | Guan | H04B 7/024 370/329 |
| 2015/0003338 | A1 | 1/2015 | Xue et al. | |
| 2015/0270917 | A1* | 9/2015 | Roman | H04J 11/005 370/329 |
| 2016/0212786 | A1 | 7/2016 | Hwang et al. | |
| 2016/0285534 | A1 | 9/2016 | Li et al. | |
| 2018/0145808 | A1* | 5/2018 | Kim | H04B 7/04 |

FOREIGN PATENT DOCUMENTS

| | | | |
|---|---|---|---|
| EP | | 1596549 A2 | 11/2005 |
| TW | | I568211 B | 1/2017 |
| WO | WO 2014/101170 A1 | | 7/2014 |
| WO | WO 2015/095843 A1 | | 6/2015 |
| WO | WO 2015/156457 A1 | | 10/2015 |
| WO | WO 2015/163709 A1 | | 10/2015 |

OTHER PUBLICATIONS

Taiwanese Office Action and Search Report for Taiwanese Application No. 105141823, dated Oct. 18, 2017.

Han et al., "The Potential Approaches to Achieve Channel Reciprocity in FDD System with Frequency Correction Algorithms," 2010 5th International ICST Conference on Communications and Networking in China (CHINACOM), Aug. 25-27, 2010, 5 pages total.

Mondal et al., "MU-MIMO Sytem Performance Analysis in LTE Evolution," 2010 IEEE 21st International Symposium on Personal Indoor and Mobile Radio Communications, 2010, pp. 1510-1515.

Onggosanusi et al., "Reduced Space Channel Feedback for FD-MIMO," IEEE ICC 2015 Mobile and Wireless Networking Symposium, 2015, pp. 3873-3878.

Ran et al., "An Adaptive Method Utilizing Channel Reciprocity in TDD-LTE System," Proceedings of ICCTA 2011, 2011, 5 pages total.

Schober et al., "MIMO-OFDM Channel Estimation with Eigenbeamforming and User-Specific Reference Signals," IEEE 69th Vehicular Technology Conference, Apr. 26-29, 2009, pp. 1-5.

Sung et al., "Large-Scale MIMO Beamforming Using Successive Channel State Estimation and Codebook Extension," 2013 IEEE 24th International Symposium on Personal, Indoor and Mobile Radio Communications: Fundamentals and PHY Track, 2013, pp. 408-413.

Yu et al., "Enhanced MU-MIMO Downlink Transmission in the FDD-Based Distributed Antennas System," IEEE Communications Letters, vol. 16, No. 1, Jan. 2012, pp. 37-39.

* cited by examiner

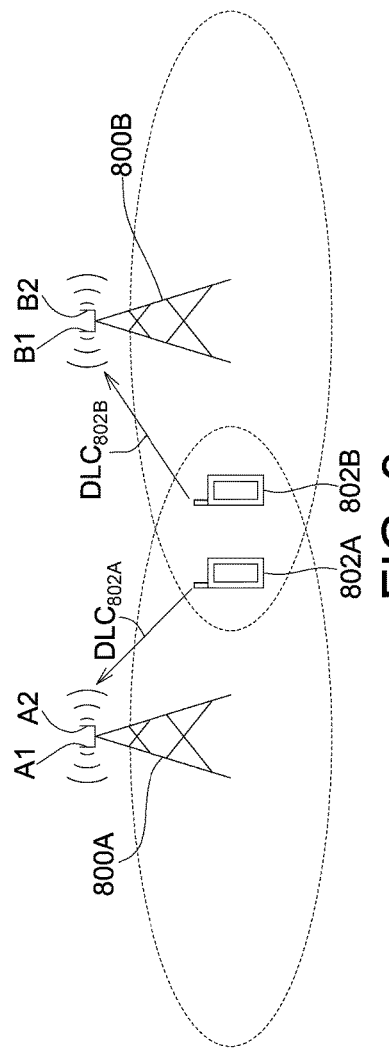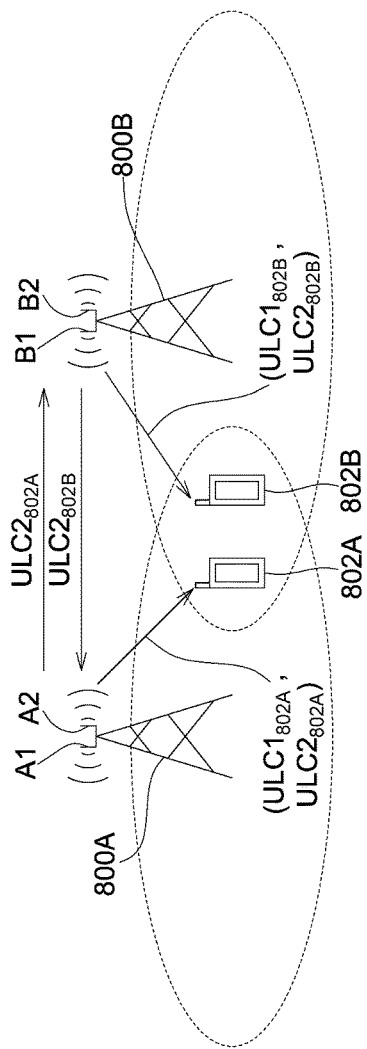

METHOD FOR TRANSMITTING CHANNEL INFORMATION AND WIRELESS COMMUNICATION SYSTEM USING THE SAME

This application claims the benefit of Taiwan application Serial No. 105141823, filed Dec. 16, 2016, the subject matter of which is incorporated herein by reference.

TECHNICAL FIELD

The disclosure relates to methods for transmitting channel information and wireless communication systems using the same.

BACKGROUND

As the demand for tranceiving data through wireless mobile communication networks grows rapidly, telecom operators begin to study how to achieve higher throughput and more stable Qos in a limited bandwidth.

To enhance the performance of wireless mobile communication systems, widen the bandwidth and improve the spectrum efficiency, the telecom operators may employ, in addition to deploying large base stations and increasing low-cost small base stations, multi-antenna techniques such as massive multi-input multi-output (MIMO) and distributed MIMO to meet the required transmission speed and service quality.

However, the performance of the multi-antenna techniques depends on how the base station acquires the downlink channel information correctly, such that the base station may use it to form constructive synthetic waves, instead of destructive synthetic waves, towards the reception apparatus such as user devices.

Therefore, there is a need to provide methods for transmitting channel information and wireless communication systems using the same, so as to effectively report the base station the downlink channel information.

SUMMARY

The present disclosure relates to methods for transmitting channel information and wireless communication systems using the same. According to the embodiments of the present disclosure, the user device may report, as instructed by the base station, a particular uplink reference signal that carries a downlink channel estimation value to the base station, so that the downlink channel information can be decoded by the base station.

According to one of the exemplary embodiments of the disclosure, a method, adapted to a base station, for transmitting channel information is provided. The method includes the following steps: a first uplink reference signal and a second uplink reference signal are received from a user device; an uplink channel estimation value is obtained according to the first uplink reference signal; and a downlink channel estimation value is obtained according to the second uplink reference signal and the uplink channel estimation value.

According to one of the exemplary embodiments of the disclosure, a method, adapted to a user device, for transmitting channel information is provided. The method includes the following steps: in response to information of uplink reference signal configuration from a base station, a first uplink original reference signal and a second uplink original reference signal are generated; a encoded second uplink original reference signal is generated by pre-coding the second uplink original reference signal with a downlink channel estimation value or a downlink channel variation value, the downlink channel variation value being a difference value between the downlink channel estimation value and a previous downlink channel estimation value; and the first uplink original reference signal and the encoded second uplink original reference signal are transmitted back to the base station.

A wireless communication system includes a first base station and a first user device. The first base station is configured to: receive a first uplink reference signal and a second uplink reference signal; obtain an uplink channel estimation value according to the first uplink reference signal; and obtain a downlink channel estimation value according to the uplink channel estimation value and the second uplink reference signal. The first user device is configured to: in response to information of uplink reference signal configuration from the first base station, generate a first uplink original reference signal and a second uplink original reference signal; pre-code the second uplink original reference signal with the downlink channel estimation value or a downlink channel variation value to generate a encoded second uplink original reference signal, the encoded second uplink original reference signal being a difference value between the downlink channel estimation value and a previous downlink channel estimation value; transmit the first uplink original reference signal so that the first base station receives the first uplink reference signal; and transmit the encoded second uplink original reference signal so that the first base station receives the second uplink reference signal.

The foregoing will become better understood with regard to the following detailed description of the preferred but non-limiting embodiment(s). The following description is made with reference to the accompanying drawings.

BRIEF DESCRIPTION OF THE DRAWINGS

FIGS. 8-11 schematically illustrate different stages of the method for transmitting channel information in accordance with an exemplary embodiment of the disclosure.

DETAILED DESCRIPTION

A number of exemplary embodiments will be described below in detail. However, the exemplary embodiments of the disclosure are for detailed descriptions only, not for limiting the scope of protection of the invention.

Figure 1:
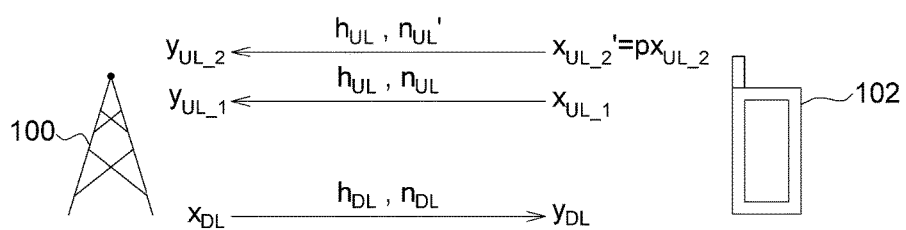
FIG. 1 illustrates a schematic diagram of a wireless communication system in accordance with an exemplary embodiment of the disclosure.

FIG. 1 illustrates a schematic diagram of a wireless communication system 10 in accordance with an exemplary embodiment of the disclosure. The wireless communication system 10 includes a base station 100 and a user device 102. Although only one base station 100 and only one user device 102 are shown in FIG. 1, this is just for the ease of illustration, and actually, the wireless communication system 10 may include one or more base stations 100 and one or more user devices 102.

The physical transmission channel from the base station 100 to the user device 102 refers to a downlink channel, while the physical transmission channel from the user device 102 to the base station 100 refers to an uplink channel. Generally, if the wireless communication system 10 adopts time division duplexing (TDD), the base station 100 can precisely convert the measured uplink channel status into the downlink channel status based on the feature of channel reciprocity because both the downlink channel and the uplink channel use the same frequency bands during the transmission of the base station 100 and the user device 102.

However, if the wireless communication system 10 adopts frequency division duplexing (FDD), the downlink channel and the uplink channel use different frequency bands during the transmission of the base station 100 and the user device 102. Accordingly, the base station 100 cannot directly convert the measured uplink channel status into the downlink channel status by using the feature of channel reciprocity.

To address this issue, according to the exemplary embodiments of the disclosure, the user device 102 may report, as instructed by the base station 100, a particular uplink reference signal carrying a downlink channel estimation value to the base station 100, so that the downlink channel information can be decoded by the base station 100.

As shown in FIG. 1, first, the base station 100 transmits a downlink original reference signal $x_{DL}$ to the user device 102, such that the user device 102 receives a downlink reference signal $y_{DL}$. Because a transmitted signal will be influenced by the channel and the noises, the downlink reference signal $y_{DL}$ can be expressed as follows:

$$y_{DL} = h_{DL} x_{DL} + n_{DL} \quad \text{(equation 1)}$$

where $h_{DL}$ represents the downlink channel estimation value; $x_{DL}$ represents the downlink original reference signal; and $n_{DL}$ represents the downlink channel noise.

In an aspect, the downlink original reference signal $x_{DL}$ is deemed as a downlink reference signal $y_{DL}$ that has not been influenced by the channel and the noises, or an original value of the downlink reference signal $y_{DL}$.

The base station 100 may communicate the value of the downlink original reference signal $x_{DL}$ with the user device 102 in advance. Therefore, for the user device 102, the value of the downlink original reference signal $x_{DL}$ is known. In such cases, the user device 102 may use the following equation to obtain the downlink channel estimation value $h_{DL}$:

$$h_{DL} = \frac{y_{DL} - n_{DL}}{x_{DL}} \quad \text{(equation 2)}$$

The user device 102 may further generate, as instructed by the base station 100, the first uplink original reference signal $x_{UL\_1}$ and the second uplink original reference signal $x_{UL\_2}$. The first uplink original reference signal $x_{UL\_1}$ can be any reference signal provided to the base station 100 for measuring the uplink channel status, which is sent by the user device 102 and received as the first uplink reference signal $y_{UL\_1}$ at the base station 100. The first uplink reference signal $y_{UL\_1}$ can be expressed as follows:

$$y_{UL\_1} = h_{UL} x_{UL\_1} + n_{UL} \quad \text{(equation 3)}$$

where $h_{UL}$ represents the uplink channel estimation value; $x_{UL\_1}$ represents the first uplink original reference signal; $n_{UL}$ represents the uplink channel noise measured with the first uplink reference signal $y_{UL\_1}$.

In an aspect, the first uplink original reference signal $x_{UL\_1}$ is deemed as a first uplink reference signal $y_{UL\_1}$ that has not been influenced by the channel and the noises, or an original value of the first uplink reference signal $y_{UL\_1}$.

For the base station 100, the value of the first uplink original reference signal $x_{UL\_1}$ is known, and the uplink channel noise $n_{UL}$ can be obtained through a noise estimation process. Therefore, the base station 100 may use the following equation to obtain the uplink channel estimation value $h_{UL}$:

$$h_{UL} = \frac{y_{UL\_1} - n_{UL}}{x_{UL\_1}} \quad \text{(equation 4)}$$

In another aspect, the user device 102 may utilize the second uplink original reference signal $x_{UL\_2}$ to carry the measured downlink channel estimation value $h_{DL}$, so that the measured downlink channel estimation value $h_{DL}$ can be brought to the base station 100. For example, the user device 102 may convert the downlink channel estimation value $h_{DL}$ into matrix elements of a pre-coding matrix p, and then multiply the pre-coding matrix p by the second uplink original reference signal $x_{UL\_2}$ to generate the encoded second uplink original reference signal $x_{UL\_2}'$. The encoded second uplink original reference signal $x_{UL\_2}'$ is sent by the user device 102 and received as the second uplink reference signal $y_{UL\_2}$ at the base station 100. The second uplink reference signal $y_{UL\_2}$ can be expressed as follows:

$$y_{UL\_2} = h_{UL}(p x_{UL\_2}) + n_{UL}' = h_{UL} x_{UL\_2}' + n_{UL}' \quad \text{(equation 5)}$$

where $n_{UL}'$ represents the uplink channel noise measured with the second uplink reference signal $y_{UL\_2}$.

In an aspect, the encoded second uplink original reference signal $x_{UL\_2}'$ is deemed as a second uplink reference signal $y_{UL\_2}$ that has not been influenced by the channel and the noises, or an original value of the second uplink reference signal $y_{UL\_2}$.

For the base station 100, the value of the second uplink original reference signal $x_{UL\_2}$ is known, $n_{UL}'$ can be obtained through a noise estimation process, and the uplink channel estimation value $h_{UL}$ can be obtained through the first uplink reference signal $y_{UL\_1}$. Therefore, the base station 100 may use the following equation to obtain the downlink channel estimation value $h_{DL}$:

$$h_{DL} = \frac{y_{UL\_2} - n_{UL}'}{h_{UL} x_{UL\_2}} \quad \text{(equation 6)}$$

Simply to say, the base station 100 first receives the first uplink reference signal $y_{UL\_1}$ and the second uplink reference signal $y_{UL\_2}$ from the user device 102, then obtains the uplink channel estimation value $h_{UL}$ according to the first uplink reference signal $y_{UL\_1}$, and obtains the downlink channel estimation value $h_{DL}$ according to the uplink channel estimation value $h_{UL}$, the second uplink reference signal $y_{UL\_2}$ and the second uplink original reference signal $x_{UL\_2}$.

In the manner described above, no matter whether the uplink channel and the downlink channel are symmetrical (e.g., using the same frequency bands), the base station 100 can still obtain the downlink channel information (downlink channel estimation value $h_{DL}$) correctly and effectively.

Figure 2:
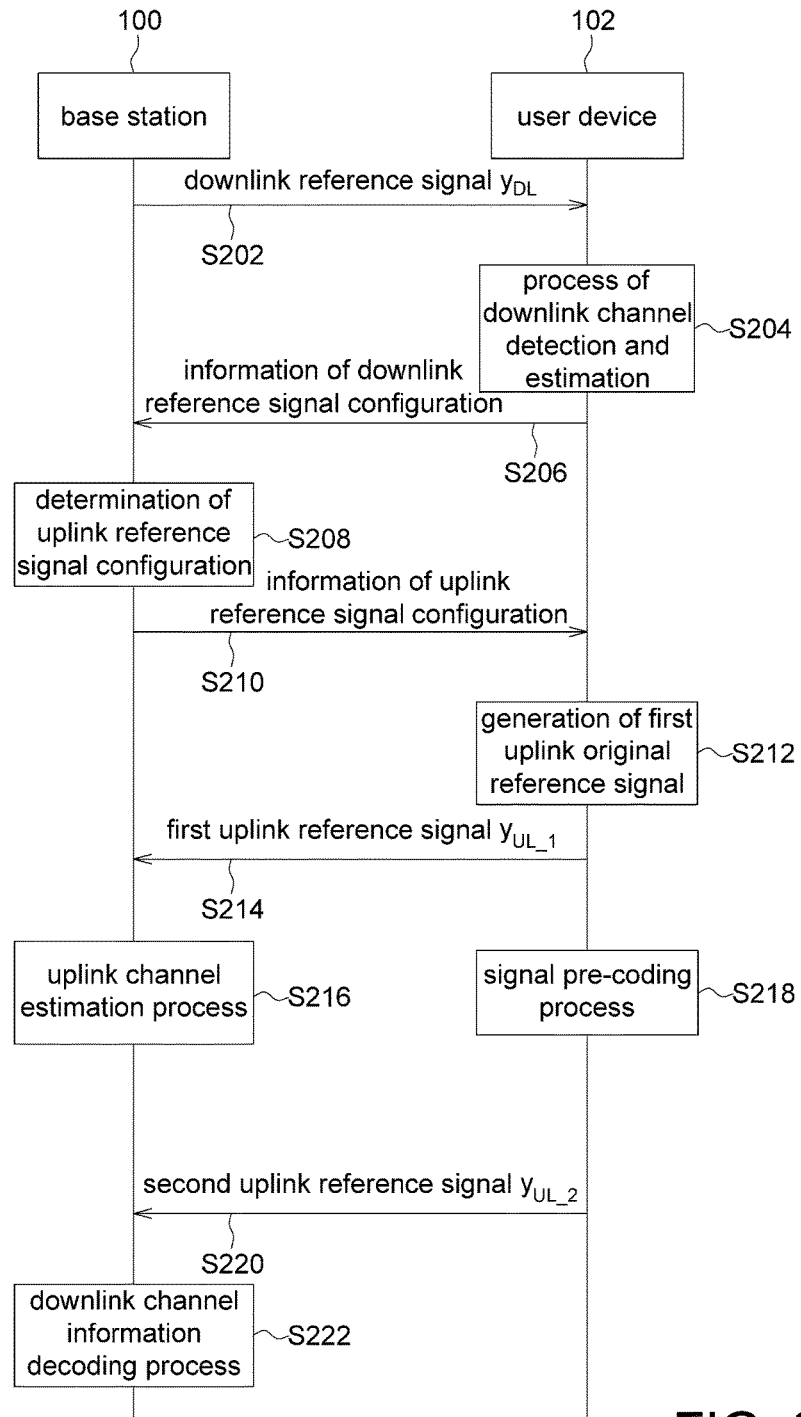
FIG. 2 illustrates a system flowchart of a method for transmitting channel information in accordance with an exemplary embodiment of the disclosure.

FIG. 2 illustrates a system flowchart of a method for transmitting channel information in accordance with an exemplary embodiment of the disclosure.

In step S202, the base station 100 sends the downlink original reference signal $x_{DL}$ to the user device 102, so that the user device 102 receives the downlink reference signal $y_{DL}$.

In step S204, the user device 102 performs a process of downlink channel detection and estimation according to the downlink reference signal $y_{DL}$, so as to obtain the downlink channel estimation value $h_{DL}$ and information of downlink reference signal configuration.

The information of downlink reference signal configuration specifies one or more base stations and antenna ports individually associated with one or more downlink channels that the user device 102 receives signals. In an exemplary embodiment, the information of downlink reference signal configuration includes a quantity of the downlink channels, a corresponding physical cell identity (PCI) value of each of the downlink channels, and a corresponding antenna port of each of the downlink channels.

In step S206, the user device 102 reports information of downlink reference signal configuration to the base station 100.

In step S208, the base station 100 determines the uplink reference signal configuration according to the information of downlink reference signal configuration, so as to generate the information of uplink reference signal configuration. The information of uplink reference signal configuration is primary configured to determine the transmission configuration of the user device 102 for transmitting the first uplink reference signal $y_{UL\_1}$ and the second uplink reference signal $y_{UL\_2}$, such as determining which subframe numbers the first uplink reference signal $y_{UL\_1}$ and the second uplink reference signal $y_{UL\_2}$ start to be transmitted, and what subframe deployment is used in the transmission (e.g., which subframe's time slot is allocated for the transmission). Thus, signal collision among different user devices 102 can be avoided. The information of uplink reference signal configuration may include, for example, a value of the first uplink original reference signal $x_{UL\_1}$ and a value of the second uplink original reference signal $x_{UL\_2}$.

In an exemplary embodiment, the base station 100 may negotiate with another base station for the transmission configuration of the user device 102 with respect to the second uplink reference signal $y_{UL\_2}$ according to the information of downlink reference signal configuration, so as to generate the information of uplink reference signal configuration.

In step S210, the base station 100 transmits the information of uplink reference signal configuration to the user device 102.

In step S212, the user device 102 generates the first uplink original reference signal $x_{UL\_1}$ according to the rule indicated by the information of uplink reference signal configuration.

In step S214, the user device 102 transmits the first uplink original reference signal $x_{UL\_1}$ to the base station 100, such that the base station 100 receives the first uplink reference signal $y_{UL\_1}$.

In step S216, the base station 100 performs an uplink channel estimation process according to the first uplink reference signal $y_{UL\_1}$. For example, the base station 100 estimates the uplink channel noise $n_{UL}$ according to the first uplink reference signal $y_{UL\_1}$, and calculates, based on the equation 4, the uplink channel estimation value $h_{UL}$ according to the first uplink reference signal $y_{UL\_1}$, the known first uplink original reference signal $x_{UL\_1}$ and the uplink channel noise $n_{UL}$.

In step S218, the user device 102 executes a signal pre-coding process. The user device 102 may generate the second uplink original reference signal $x_{UL\_2}$ according to the information of uplink reference signal configuration, and pre-code the second uplink original reference signal $x_{UL\_2}$ with the estimated downlink channel estimation value $h_{DL}$ to generate the encoded second uplink original reference signal $x_{UL\_2}'$.

For example, the user device 102 replaces the elements of the pre-coding matrix p with the one or more downlink channel estimation values $h_{DL}$, and then multiplies the pre-coding matrix p by the second uplink original reference signal $x_{UL\_2}$ to generate the encoded second uplink original reference signal $x_{UL\_2}'$.

In step S220, the user device 102 transmits the encoded second uplink original reference signal $x_{UL\_2}'$ to the base station 100, so that the base station 100 receives the second uplink reference signal $y_{UL\_2}$.

In step S222, the base station decodes the second uplink reference signal $y_{UL\_2}$ through a downlink channel information decoding process, so as to obtain the downlink channel estimation value $h_{DL}$ carried by the second uplink reference signal $y_{UL\_2}$.

For example, the base station 100 may calculate, based on the equation 6, the downlink channel estimation value $h_{DL}$ according to the second uplink reference signal $y_{UL\_2}$, the known second uplink original reference signal $x_{UL\_2}'$, the uplink channel noise $n_{UL}'$ and the uplink channel estimation value $h_{UL}$.

It is noted that the method for transmitting channel information in accordance with the exemplary embodiments of the disclosure is not required to be performed in the particular order shown in FIG. 2. For example, steps S218 and S212 can be performed at the same time. Alternatively, step S218 can be performed before step S212.

Figure 3:
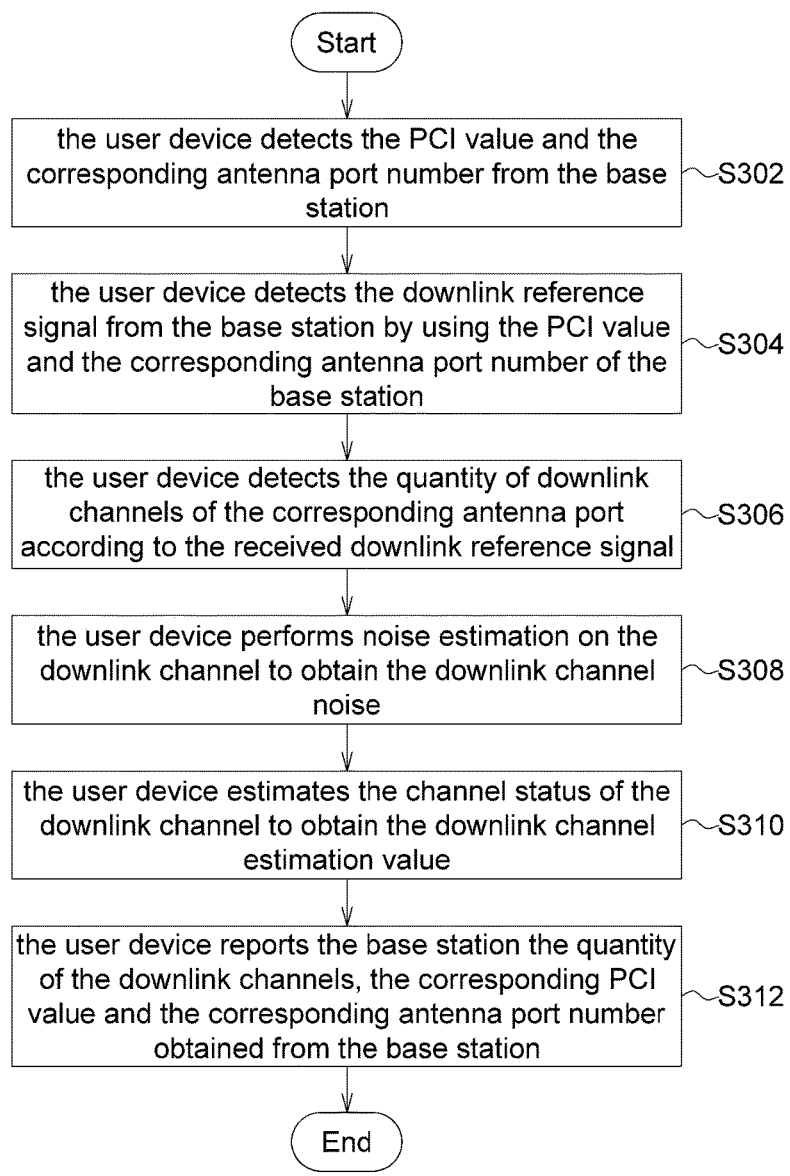
FIG. 3 illustrates a detailed flowchart of the process of downlink channel detection and estimation shown in FIG. 2.

FIG. 3 illustrates a detailed flowchart of the process of downlink channel detection and estimation shown in step S204 of FIG. 2.

At step S302, the user device 102 detects the PCI value and the corresponding antenna port number from the base station 100, so as to identify that the received signal is from which base station's which antenna.

In step S304, the user device 102 detects the downlink reference signal $y_{DL}$ from the base station 100 by using the PCI value and the corresponding antenna port number of the base station 100.

In step S306, the user device 102 detects the quantity of downlink channels of the corresponding antenna port according to the received downlink reference signal $y_{DL}$.

In step S308, the user device 102 performs noise estimation on the downlink channel to obtain the downlink channel noise $n_{DL}$.

In step S310, the user device 102 estimates the channel status of the downlink channel to obtain the downlink channel estimation value $h_{DL}$. For example, the user device 102 may, based on the equation 2, subtract the value of the downlink channel noise $n_{DL}$ from the value of the downlink reference signal $y_{DL}$, and then divide the result by the value of the downlink original reference signal $x_{DL}$, so as to obtain the downlink channel estimation value $h_{DL}$.

In step S312, the user device 102 reports the base station 100 the quantity of the downlink channels, the corresponding PCI value and the corresponding antenna port number (information of downlink reference signal configuration) obtained from the base station 100.

Figure 4:
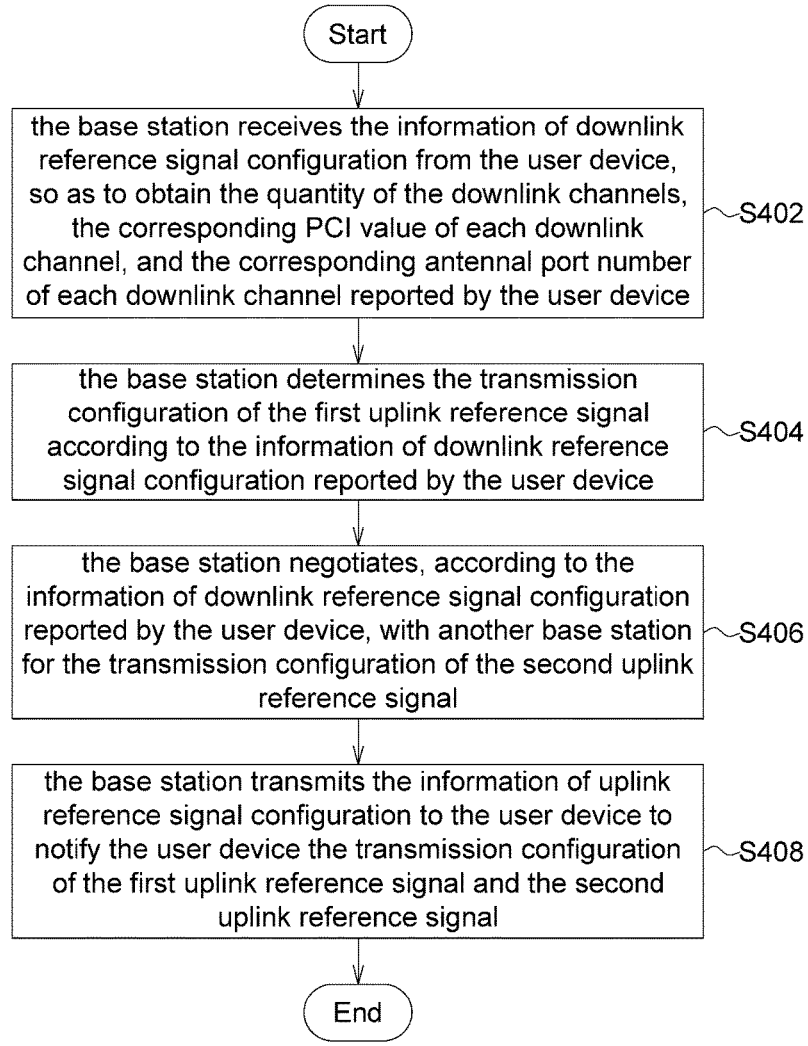
FIG. 4 illustrates a detailed flowchart of the determination of the uplink reference signal configuration shown in FIG. 2.

FIG. 4 illustrates an example of a detailed flowchart of the determination of the uplink reference signal configuration shown in step S208 of FIG. 2.

In step S402, the base station 100 receives the information of downlink reference signal configuration from the user device 102, so as to obtain the quantity of the downlink channels, the corresponding PCI value of each downlink channel, and the corresponding antenna port number of each downlink channel reported by the user device 102.

In step S404, the base station 100 determines the transmission configuration of the first uplink reference signal $y_{UL\_1}$ according to the information of downlink reference signal configuration reported by the user device 102, such as determining which subframe number the transmission is initiated and what subframe deployment is used in the transmission.

In step S406, the base station 100 negotiates, according to the information of downlink reference signal configuration reported by the user device 102, with another base station for the transmission configuration of the second uplink reference signal $y_{UL\_2}$. Therefore, signal collision among user devices that occurs when the user device 102 transmits the second uplink reference signal $y_{UL\_2}$ can be avoided.

In step S408, the base station 100 transmits the information of uplink reference signal configuration to the user device 102 to notify the user device 102 the transmission configuration of the first uplink reference signal $y_{UL\_1}$ and the second uplink reference signal $y_{UL\_2}$.

Figure 5:
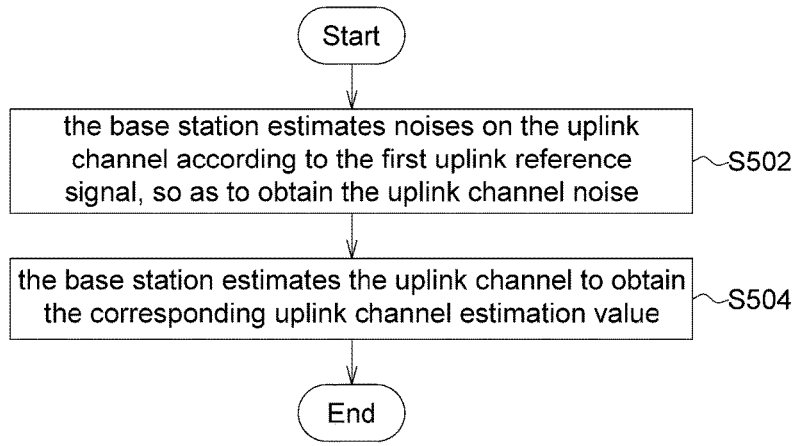
FIG. 5 illustrates a detailed flowchart of the uplink channel estimation process shown in FIG. 2.

FIG. 5 illustrates an example of a detailed flowchart of the uplink channel estimation process shown in step S216 of FIG. 2.

In step S502, the base station 100 estimates noises on the uplink channel according to the first uplink reference signal $y_{UL}$, so as to obtain the uplink channel noise $n_{UL}$.

In step S504, the base station 100 estimates the uplink channel to obtain the corresponding uplink channel estimation value $h_{UL}$. For example, the base station 100 may calculate the uplink channel estimation value $h_{UL}$ based on the equation 4. That is, the base station 100 may subtract the value of the uplink channel noise $n_{UL}$ from the value of the received first uplink reference signal $y_{UL\_1}$, and then divide the result by the value of the first uplink original reference signal $x_{UL\_1}$ to obtain the uplink channel estimation value $h_{UL}$.

Figure 6:
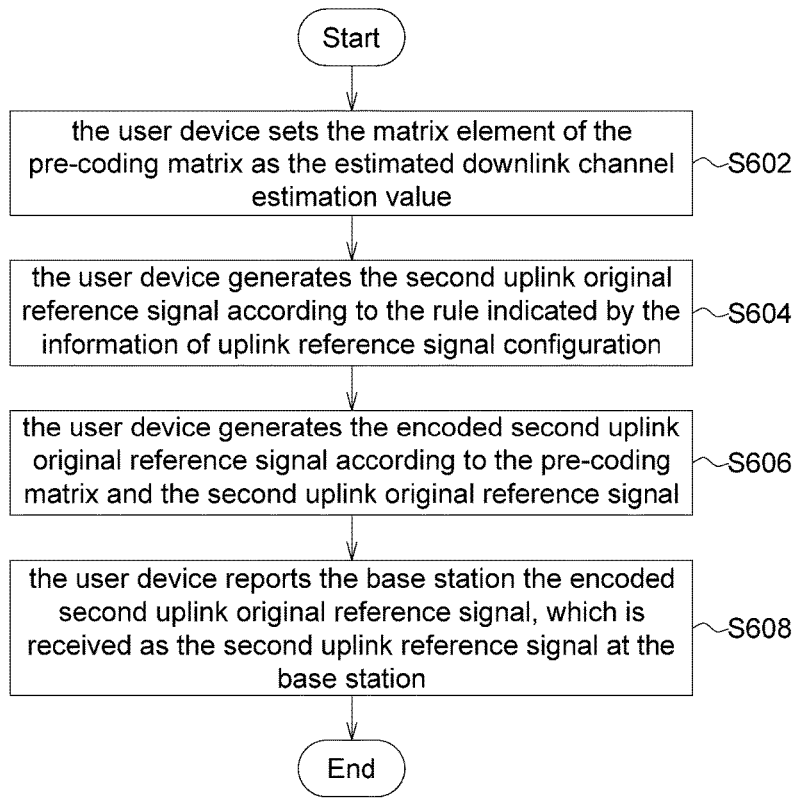
FIG. 6 illustrates a detailed flowchart of the signal pre-decoding process shown in FIG. 2.

FIG. 6 illustrates an example of a detailed flowchart of the signal pre-decoding process shown in step S218 of FIG. 2.

In step S602, the user device 102 sets the matrix element of the pre-coding matrix p as the estimated downlink channel estimation value $h_{DL}$.

In step S604, the user device 102 generates the second uplink original reference signal $x_{UL\_2}$ according to the rule indicated by the information of uplink reference signal configuration.

In step S606, the user device 102 generates the encoded second uplink original reference signal $x_{UL\_2}'$ according to the pre-coding matrix p and the second uplink original reference signal $x_{UL\_2}$. For example, the user device 102 multiplies the value of the matrix element of the pre-coding matrix p by the value of the second uplink original reference signal $x_{UL\_2}$ to obtain the encoded second uplink original reference signal $x_{UL\_2}'$.

In step S608, the user device 102 reports the base station 100 the encoded second uplink original reference signal $x_{UL\_2}'$, which is received as the second uplink reference signal $y_{UL\_2}$ at the base station 100.

Figure 7:
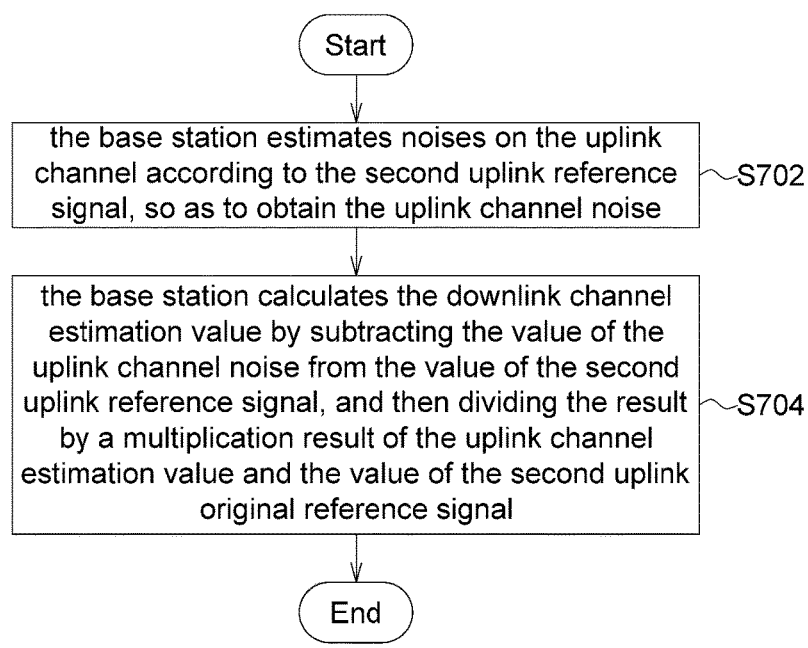
FIG. 7 illustrates a detailed flowchart of the downlink channel information decoding process shown in FIG. 2.

FIG. 7 illustrates an example of a detailed flowchart of the downlink channel information decoding process shown in step S222 of FIG. 2.

In step S702, the base station 100 estimates noises on the uplink channel according to the second uplink reference signal $y_{UL\_2}$, so as to obtain the uplink channel noise $n_{UL}'$.

In step S704, the base station 100 calculates, based on the equation 6, the downlink channel estimation value $h_{DL}$ by subtracting the value of the uplink channel noise $n_{UL}'$ from the value of the second uplink reference signal $y_{UL\_2}$, and then dividing the result by a multiplication result of the uplink channel estimation value $h_{UL}$ and the value of the second uplink original reference signal $x_{UL\_2}$.

FIGS. 8-11 schematically illustrate different stages of the method for transmitting channel information in accordance with an exemplary embodiment of the disclosure.

Figure 8:
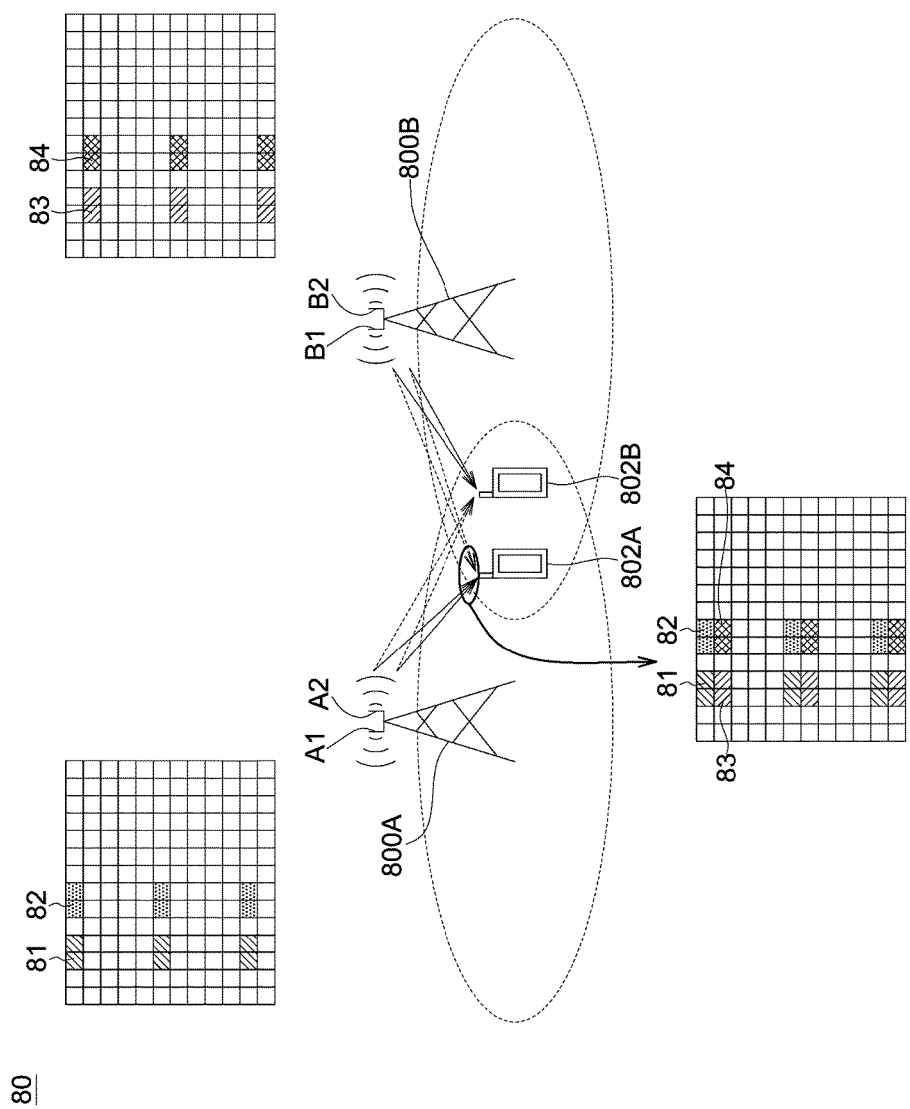

Please refer to FIG. 8. The wireless communication system 80 includes a first base station 800A, a second base station 800B, a first user device 802A and a second user device 802B. In this example, the first and second user devices 802A, 802B locate in a common signal coverage area provided by the first and second base stations 800A, 800B, wherein the first user device 802A is served by the first base station 800A and not by the second user device 802B, while the second user device 802B is served by the second base station 800B and not by the first user device 802A.

The first base station 800A includes two antennas A1, A2. The second base station 800B includes two antennas B1, B2. Each of the first and second user devices 802A, 802B includes one antenna.

The first and second user devices 802A, 802B may receive the PCI values of the first and second base stations 800A, 800B (e.g., the PCI value of the first base station 800A is PCI_A, and the PCI value of the second base station 800B is PCI_B), and receive the downlink reference signals and the quantity of the downlink channels form each antenna of the first and second base stations 800A, 800B.

In the examples of FIGS. 8-11, if a parameter in formula is denoted with a superscript and a subscript, the superscript represents the signal sending terminal corresponding to the parameter, and the subscript represents the signal receiving terminal corresponding to the parameter.

Taking the first user device 802 A as an example, the downlink reference signal received by the first user device 802 A can be expressed as:

$$\begin{bmatrix} y_{802A}^{(800A,A1)} & y_{802A}^{(800A,A2)} \\ y_{802A}^{(800B,B1)} & y_{802A}^{(800B,B2)} \end{bmatrix} \quad \text{(equation 7)}$$

where $y_{802A}^{(800A,A1)}$ represents the downlink reference signal that the first user device 802A receives from the antenna A1 of the first base station 800A; $y_{802A}^{(800A,A2)}$ represents the downlink reference signal that the first user device 802A receives from the antenna A2 of the first base station 800A; $y_{802A}^{(800B,B1)}$ represents the downlink reference signal that the first user device 802A receives from the antenna B1 of the second base station 800B; $y_{802A}^{(800B,B2)}$ represents the downlink reference signal that the first user device 802A receives from the antenna B2 of the second base station 800B.

In the example of FIG. 8, the downlink reference signals $y_{802A}^{(800A,A1)}$, $y_{802A}^{(800A,A2)}$, $y_{802A}^{(800B,B1)}$ and $y_{802A}^{(800B,B2)}$ are transmitted respectively through the time-frequency resources 81, 82, 83 and 84. Each block depicted in the figure represents a unit of the time-frequency resources.

The downlink channel noises that individually corresponding to the downlink reference signals $$\begin{bmatrix} y_{802A}^{(800A,A1)} & y_{802A}^{(800A,A2)} \\ y_{802A}^{(800B,B1)} & y_{802A}^{(800B,B2)} \end{bmatrix}$$

can be expressed as:

$$\begin{bmatrix} n_{802A}^{(800A,A1)} & n_{802A}^{(800A,A2)} \\ n_{802A}^{(800B,B1)} & n_{802A}^{(800B,B2)} \end{bmatrix} \quad \text{(equation 8)}$$

The downlink original reference signals that individually corresponding to the downlink reference signals $$\begin{bmatrix} y_{802A}^{(800A,A1)} & y_{802A}^{(800A,A2)} \\ y_{802A}^{(800B,B1)} & y_{802A}^{(800B,B2)} \end{bmatrix}$$

can be expressed as:

$$\begin{bmatrix} x_{802A}^{(800A,A1)} & x_{802A}^{(800A,A2)} \\ x_{802A}^{(800B,B1)} & x_{802A}^{(800B,B2)} \end{bmatrix} \quad \text{(equation 9)}$$

Based on the equations 4 and 7-9, four downlink channel estimation values for the downlink channels between the first user device 802A and the antennas A1, A2, B1, B2 of the base stations 800A, 800B can be obtained as:

$$\begin{bmatrix} h_{802A}^{(800A,A1)} & h_{802A}^{(800A,A2)} \\ h_{802A}^{(800B,B1)} & h_{802A}^{(800B,B2)} \end{bmatrix} = \begin{bmatrix} \frac{y_{802A}^{(800A,A1)} - n_{802A}^{(800A,A1)}}{x_{802A}^{(800A,A1)}} & \frac{y_{802A}^{(800A,A2)} - n_{802A}^{(800A,A2)}}{x_{802A}^{(800A,A2)}} \\ \frac{y_{802A}^{(800B,B1)} - n_{802A}^{(800B,B1)}}{x_{802A}^{(800B,B1)}} & \frac{y_{802A}^{(800B,B2)} - n_{802A}^{(800B,B2)}}{x_{802A}^{(800B,B2)}} \end{bmatrix} \quad \text{(equation 10)}$$

where $h_{802A}^{(800A,A1)}$ represents the downlink channel estimation value for the downlink channel from the antenna A1 of the first base station 800A to the first user device 802A; $h_{802A}^{(800A,A2)}$ represents the downlink channel estimation value for the downlink channel from the antenna A2 of the first base station 800A to the first user device 802A; $h_{802A}^{(800B,B1)}$ represents the downlink channel estimation value for the downlink channel from the antenna B1 of the second base station 800B to the first user device 802A; $h_{802A}^{(800B,B2)}$ represents the downlink channel estimation value for the downlink channel from the antenna B2 of the second base station 800B to the first user device 802A.

Next, please refer to FIG. 9. The first and second user devices 802A, 802B respectively report the quantity, the corresponding PCI value and the corresponding antenna port of the downlink channels (information of downlink reference signal configuration) to the corresponding base stations.

As shown in FIG. 9, the information of downlink reference signal configuration, $DLC_{802A}$, that the first user device 802A reports to the first base station 800A can be expressed as:

$$DLC_{802A} = \begin{bmatrix} PCI\_A_{802A}^{(800A,A1)} & PCI\_A_{802A}^{(800A,A2)} \\ PCI\_B_{802A}^{(800B,B1)} & PCI\_B_{802A}^{(800B,B2)} \end{bmatrix} \quad \text{(equation 11)}$$

where $PCI\_A_{802A}^{(800A,A1)}$ represents the PCI value corresponding to the downlink channel from the antenna A1 of the first base station 800A to the first user device 802A; $PCI\_B_{802A}^{(800B,B1)}$ represents the PCI value corresponding to the downlink channel from the antenna B1 of the second base station 800B to the first user device 802A; $PCI\_A_{802A}^{(800A,A2)}$ represents the PCI value corresponding to the downlink channel from the antenna A2 of the first base station 800A to the first user device 802A; $PCI\_B_{802A}^{(800B,B2)}$ represents the PCI value corresponding to the downlink channel from the antenna B2 of the second base station 800B to the first user device 802A.

The information of downlink reference signal configuration $DLC_{802B}$ that the second user device 802B reports to the second base station 800B can be expressed as:

$$DLC_{802B} = \begin{bmatrix} PCI\_A_{802B}^{(800A,A1)} & PCI\_A_{802B}^{(800A,A2)} \\ PCI\_B_{802B}^{(800B,B1)} & PCI\_B_{802B}^{(800B,B2)} \end{bmatrix} \quad \text{(equation 12)}$$

where $PCI\_A_{802B}^{(800A,A1)}$ represents the PCI value corresponding to the downlink channel from the antenna A1 of the first base station 800A to the second user device 802B; $PCI\_B_{802B}^{(800B,B1)}$ represents the PCI value corresponding to the downlink channel from the antenna B1 of the second base station 800B to the second user device 802B; $PCI\_A_{802B}^{(800A,A2)}$ represents the PCI value corresponding to the downlink channel from the antenna A2 of the first base station 800A to the second user device 802B; $PCI\_B_{802B}^{(800B,B2)}$ represents the PCI value corresponding to the downlink channel from the antenna B2 of the second base station 800B to the second user device 802B.

Next, please refer to FIG. 10. The first and second base stations 800A, 800B negotiate with each other for the transmission configuration of the first and second user devices 802A, 802B that transmit the second uplink reference signals, respectively. As shown in FIG. 10, the transmission configuration $ULC2_{802A}$ is a transmission configuration that the first user device 802A uses to report the reference signals. The transmission configuration $ULC2_{802B}$ is a transmission configuration that the second user device 802B uses to report the reference signals. In order to avoid signal collision or interference when sending signals, the first and second base stations 800A, 800B may communication the transmission configurations $ULC2_{802A}$, $ULC2_{802B}$ with each other to coordinate the transmissions of the first and second user devices 802A, 802B, such as determining which subframe numbers the first and second user devices 802A, 802B can start to transmit the second uplink reference signals, and what subframe deployment is used in the transmission.

The first base station 800A then notifies the first user device 802A the transmission configuration $ULC1_{802A}$ of the corresponding first uplink reference signal and the transmission configuration $ULC2_{802A}$ of the corresponding second uplink reference signal. Also, the second base station 800B notifies the second user device 802B the transmission configuration ULC1$_{802B}$ of the corresponding first uplink reference signal and the transmission configuration ULC2$_{802B}$ of the corresponding second uplink reference signal. Here, the transmission configuration ULC1$_{802A}$ refers to a transmission configuration that the first user device 802A used to report the first uplink reference signal, and the transmission configuration ULC1$_{802B}$ refers to a transmission configuration that the second user device 802B used to report the first uplink reference signal.

Figure 11:
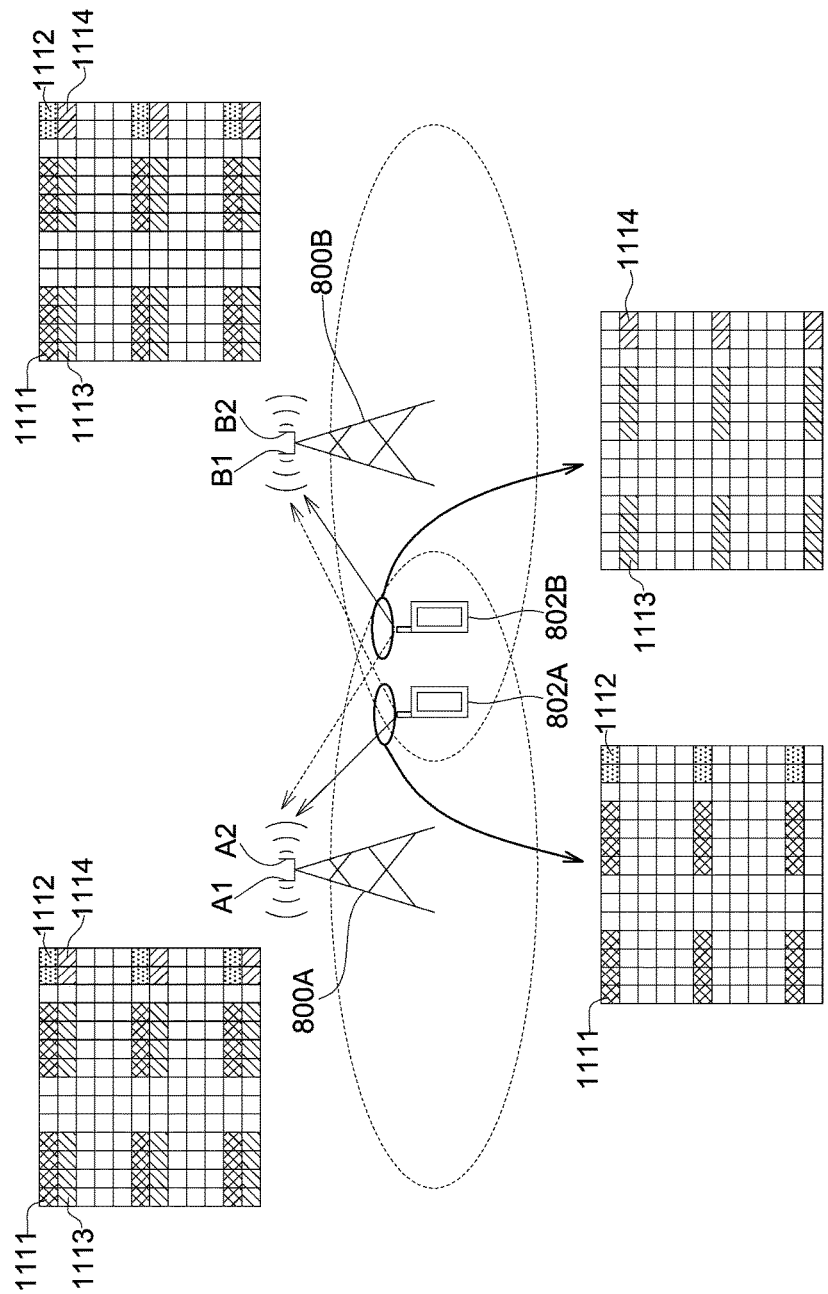

Next, please refer to FIG. 11. The first user device 802A sets the values of the matrix elements of the pre-coding matrix as the four obtained downlink channel estimation values h$_{802A}^{(800A,A1)}$, h$_{802A}^{(800A,A2)}$, h$_{802A}^{(800B,B1)}$ and h$_{802A}^{(800B,B2)}$, so as to generate the corresponding pre-coding matrix p$_{802A}$ as follows:

$$p_{802A} = \begin{bmatrix} h_{802A}^{(800A,A1)} & h_{802A}^{(800A,A2)} \\ h_{802A}^{(800B,B1)} & h_{802A}^{(800B,B2)} \end{bmatrix} \quad \text{(equation 13)}$$

Likewise, the second user device 802B may generate the pre-coding matrix p$_{802B}$ as follows:

$$p_{802B} = \begin{bmatrix} h_{802B}^{(800A,A1)} & h_{802B}^{(800A,A2)} \\ h_{802B}^{(800B,B1)} & h_{802B}^{(800B,B2)} \end{bmatrix} \quad \text{(equation 14)}$$

where h$_{802B}^{(800A,A1)}$ represents the downlink channel estimation value for the downlink channel from the antenna A1 of the first base station 800A to the second user device 802B; h$_{802B}^{(800A,A2)}$ represents the downlink channel estimation value for the downlink channel from the antenna A2 of the first base station 800A to the second user device 802B; h$_{802B}^{(800B,B1)}$ represents the downlink channel estimation value for the downlink channel from the antenna B1 of the second base station 800B to the second user device 802B; h$_{802B}^{(800B,B2)}$ represents the downlink channel estimation value for the downlink channel from the antenna B2 of the second base station 800B to the second user device 802B.

The first user device 802A may multiply the pre-coding matrix p$_{802A}$ by the second uplink original reference signal to generate the corresponding encoded second uplink original reference signal. The second user device 802B may multiply the pre-coding matrix p$_{802B}$ by the second uplink original reference signal to generate the corresponding encoded second uplink original reference signal.

Then, the first user device 802A transmits the first uplink original reference signal and the encoded second uplink original reference signal. Because the first user device 802A locates in the common signal coverage area of the first and second base stations 800A, 800B, the first uplink original reference signal and the encoded second uplink original reference signal transmitted by the first user device 802A can be sent to both the first and second base stations 800A, 800B. In other words, both the first and second base stations 800A, 800B may receive the first uplink reference signal and the second uplink reference signal from the first user device 802A.

Likewise, the first uplink original reference signal and the encoded second uplink original reference signal transmitted by the second user device 802B are received as the first uplink reference signal and the second uplink reference signal at both the first and second base stations 800A, 800B.

As shown in FIG. 11, the first and second uplink reference signals from the first user device 802A are corresponding to the time-frequency resources 1111 and 1112, respectively; and the first and second uplink reference signals from the second user device 802B are corresponding to the time-frequency resources 1113 and 1114, respectively.

The first base station 800A may calculate, according to the first uplink reference signal that the antenna A1 receives from the first user device 802, the uplink channel estimation value h$_{(800A,A1)}^{802A}$ as follows:

$$h_{(800A,A1)}^{802A} = \frac{y1_{(800A,A1)}^{802A} - n_{(800A,A1)}^{802A}}{x1_{800A}^{802A}} \quad \text{(equation 15)}$$

where y1$_{(800A,A1)}^{802A}$ represents the first uplink reference signal received by the antenna A1 of the first base station 800A; n$_{(800A,A1)}^{802A}$ represents the uplink channel noise; and x1$_{800A}^{802A}$ represents the first uplink original reference signal corresponding to the first uplink reference signal y1$_{(800A,A1)}^{802A}$.

Based on the same mechanism, the first and second base stations 800A, 800B can obtain the uplink channel estimation values for the uplink channels from each user device to each antenna.

On the other hand, the second uplink reference signal, y2$_{(800A,A1)}^{802A}$(•), that the antenna A1 of the first base station 800A receives from the first user device 802A can be expressed as follows:

$$\begin{bmatrix} y2_{(800A,A1)}^{802A}(h_{802A}^{(800A,A1)}) & y2_{(800A,A1)}^{802A}(h_{802A}^{(800A,A2)}) \\ y2_{(800A,A1)}^{802A}(h_{802A}^{(800B,B1)}) & y2_{(800A,A1)}^{802A}(h_{802A}^{(800B,B2)}) \end{bmatrix} = \quad \text{(equation 16)}$$

$$\begin{bmatrix} h_{(800A,A1)}^{802A}(h_{802A}^{(800A,A1)}x2_{800A}^{802A}) + n_{(800A,A1)}^{802A} & h_{(800A,A1)}^{802A}(h_{802A}^{(800A,A2)}x2_{800A}^{802A}) + n_{(800A,A1)}^{802A} \\ h_{(800A,A1)}^{802A}(h_{802A}^{(800B,B1)}x2_{800A}^{802A}) + n_{(800A,A1)}^{802A} & h_{(800A,A1)}^{802A}(h_{802A}^{(800B,B2)}x2_{800A}^{802A}) + n_{(800A,A1)}^{802A} \end{bmatrix}$$

Here, the second uplink reference signal y2$_{(800A,A1)}^{802A}$(•) is represented as a function that varies with a carried downlink channel estimation value. Take the second uplink reference signal y2$_{(800A,A1)}^{802A}$(h$_{802A}^{(800A,A1)}$) as an example, it refers to a second uplink reference signal that carries the downlink channel estimation value h$_{802A}^{(800A,A1)}$, and is transmitted from the first user device 802A to the antenna A1 of the first base station 800A.

In equation 16, h$_{(800A,A1)}^{802A}$ represents the uplink channel estimation value for the uplink channel from the first user device 802A to the antenna A1 of the first base station 800A;

$x2_{800A}^{802A}$ represents the second uplink original reference signal for the uplink channel from the first user device 802A to the first base station 800A; $n_{(800A,A1)}^{802A}$ represents the uplink channel noise; and $h_{802A}^{(800A,A1)}$, $h_{802A}^{(800A,A2)}$, $h_{802A}^{(800B,B1)}$ and $h_{802A}^{(800B,B2)}$ represent the four downlink channel estimation values measured by the first user device 802A.

Then, the first base station 800A decodes the matrix elements presented in the pre-coding matrix $p_{802A}$ for obtaining the downlink channel estimation values measured by the first user device 802A:

$$P_{802A} = \begin{bmatrix} h_{802A}^{(800A,A1)} & h_{802A}^{(800A,A2)} \\ h_{802A}^{(800B,B1)} & h_{802A}^{(800B,B2)} \end{bmatrix} = \begin{bmatrix} \frac{y2_{(800A,A1)}^{802A}(h_{802A}^{(800A,A1)}) - n_{(800A,A1)}^{802A}}{h_{(800A,A1)}^{802A}x2_{800A}^{802A}} & \frac{y2_{(800A,A1)}^{802A}(h_{802A}^{(800A,A2)}) - n_{(800A,A1)}^{802A}}{h_{(800A,A1)}^{802A}x2_{800A}^{802A}} \\ \frac{y2_{(800A,A1)}^{802A}(h_{802A}^{(800B,B1)}) - n_{(800A,A1)}^{802A}}{h_{(800A,A1)}^{802A}x2_{800A}^{802A}} & \frac{y2_{(800A,A1)}^{802A}(h_{802A}^{(800B,B2)}) - n_{(800A,A1)}^{802A}}{h_{(800A,A1)}^{802A}x2_{800A}^{802A}} \end{bmatrix}$$

(equation 17)

The first base station 800A may also decode the matrix elements presented in the pre-coding matrix $p_{802B}$ for obtaining the downlink channel estimation values measured by the second user device 802B:

$$P_{802B} = \begin{bmatrix} h_{802B}^{(800A,A1)} & h_{802B}^{(800A,A2)} \\ h_{802B}^{(800B,B1)} & h_{802B}^{(800B,B2)} \end{bmatrix} = \begin{bmatrix} \frac{y2_{(800A,A1)}^{802B}(h_{802B}^{(800A,A1)}) - n_{(800A,A1)}^{802B}}{h_{(800A,A1)}^{802B}x2_{800A}^{802B}} & \frac{y2_{(800A,A1)}^{802B}(h_{802B}^{(800B,A2)}) - n_{(800A,A1)}^{802B}}{h_{(800A,A1)}^{802B}x2_{800A}^{802B}} \\ \frac{y2_{(800A,A1)}^{802B}(h_{802B}^{(800B,B1)}) - n_{(800A,A1)}^{802B}}{h_{(800A,A1)}^{802B}x2_{800A}^{802B}} & \frac{y2_{(800A,A1)}^{802B}(h_{802B}^{(800B,B2)}) - n_{(800A,A1)}^{802B}}{h_{(800A,A1)}^{802B}x2_{800A}^{802B}} \end{bmatrix}$$

(equation 18)

In the manner described above, although the second user device 802B is not served by the first base station 800A, the first base station 800A receives the first uplink reference signal and the second uplink reference signal from the second user device 802B. Therefore, the first base station 800A can obtain the corresponding uplink channel estimation value according to the first uplink reference signal of the second user device 802B, and obtain the downlink channel estimation value measured by the second user device 802B according to the obtained uplink channel estimation value and the second uplink reference signal of the second user device 802B.

In an exemplary embodiment, after obtaining the downlink channel estimation value measured by the second user device 802B, the first base station 800A may transmit the it to the base station serving the second user device 802B, e.g., the second base station 800B.

Based on the above, methods for transmitting channel information and wireless communication systems using the same are provided. According to the exemplary embodiments of the disclosure, the user device may report, as instructed by the base station, a particular uplink reference signal carrying a downlink channel estimation value to the base station, so that the base station can use this reference signal to decode the downlink channel information. The information carried by the particular uplink reference signal that the user device reports to the base station is not limited to the downlink channel estimation value. It can also be the associated information of the downlink channel estimation value, such as a difference (downlink channel variation value) between a previously measured downlink channel estimation value (previous downlink channel estimation value) and a currently measured downlink channel estimation value. In such cases, the base station first decodes the difference between two consecutively obtained channel estimation values, and then performs compensation computation on the difference to obtain the current downlink channel estimation value. In this manner, even if the uplink channel and the downlink channel are not symmetrical during the transmission, the base station can still effectively obtain the status information of the downlink channel. Therefore, the base station performs a proper pre-coding process on the downlink signal, so as to eliminate the influence of the channel effect on the signal, thereby improving the overall transmission quality of the wireless mobile communication networks.

It will be apparent to those skilled in the art that various modifications and variations can be made to the disclosed exemplary embodiments. It is intended that the specification and examples be considered as exemplary only, with a true scope of the disclosure being indicated by the following claims and their equivalents.

What is claimed is:

1. A method for transmitting channel information, adapted to a base station, comprising:
    receiving a first uplink reference signal and a second uplink reference signal from a user device,
    obtaining an uplink channel estimation value according to the first uplink reference signal, and
    obtaining a downlink channel estimation value according to the second uplink reference signal and the uplink channel estimation value;
    further comprising:
    receiving another first uplink reference signal and another second uplink reference signal from another user device not served by the base station;
    obtaining another uplink channel estimation value according to the another first uplink reference signal; and
    obtaining another downlink channel estimation value according to the another uplink channel estimation value and the another second uplink reference signal;
    generating an encoded second uplink reference signal by pre-coding the second uplink reference signal with the downlink channel estimation value or a downlink channel variation value, the downlink channel variation value being a difference value between the downlink channel estimation value and a previous downlink channel estimation value; and
    transmitting the first uplink reference signal and the encoded second uplink reference signal back to the base station.

2. The method of claim 1, further comprising:
    providing information of uplink reference signal configuration to the user device, so that the user device generates a first uplink original reference signal and a second uplink original reference signal according to the information of uplink reference signal configuration;

wherein the first uplink original reference signal sent by the user device is received as the first uplink reference signal at the base station; and an encoded second uplink original reference signal, which is generated by pre-coding the second uplink original reference signal with the downlink channel estimation value, is received as the second uplink reference signal at the base station after being sent by the user device.

3. The method of claim 2, wherein the encoded second uplink original reference signal is a result of multiplying the second uplink original reference signal by a pre-coding matrix that comprises the downlink channel estimation value.

4. The method of claim 2, further comprising:
receiving information of downlink reference signal configuration from the user device; and
negotiating with another base station for a transmission configuration of the second uplink reference signal according to the information of downlink reference signal configuration, so as to generate the information of uplink reference signal configuration.

5. The method of claim 4, wherein the information of downlink reference signal configuration comprises a quantity of downlink channels, a corresponding physical cell identity (PCI) value of each of the downlink channels, and a corresponding antenna port of each of the downlink channels.

6. The method of claim 2, further comprising:
estimating an uplink channel noise according to the first uplink reference signal; and
obtaining the uplink channel estimation value according to the first uplink reference signal, the information of uplink reference signal configuration, and the uplink channel noise.

7. The method of claim 2, further comprising:
estimating an uplink channel noise according to the second uplink reference signal; and
obtaining the downlink channel estimation value according to the second uplink reference signal, the uplink channel noise, the uplink channel estimation value and the information of uplink reference signal configuration.

8. The method of claim 2, wherein the information of uplink reference signal configuration comprises a value of the first uplink original reference signal and a value of the second uplink original reference signal.

9. The method of claim 1, further comprising:
providing information of uplink reference signal configuration to the user device, so that the user device generates a first uplink original reference signal and a second uplink original reference signal according to the information of uplink reference signal configuration;
wherein the first uplink original reference signal sent by the user device is received as the first uplink reference signal at the base station;
an encoded second uplink original reference signal, which is generated by pre-coding the second uplink original reference signal with a downlink channel variation value, is received as the second uplink reference signal at the base station after being sent by the user device; and
the downlink channel variation value is a difference value between the downlink channel estimation value and a previous downlink channel estimation value.

10. A method for transmitting channel information, adapted to a user device, comprising:

in response to information of uplink reference signal configuration from a base station, generating a first uplink original reference signal and a second uplink original reference signal;
obtaining an uplink channel estimation value according to the first uplink original reference signal, and
obtaining a downlink channel estimation value according to the second uplink original reference signal and the uplink channel estimation value;
further comprising:
transmitting another first uplink reference signal and another second uplink reference signal from another user device not served by the base station;
obtaining another uplink channel estimation value according to the another first uplink reference signal; and
obtaining another downlink channel estimation value according to the another uplink channel estimation value and the another second uplink reference signal;
generating an encoded second uplink original reference signal by pre-coding the second uplink original reference signal with the downlink channel estimation value or a downlink channel variation value, the downlink channel variation value being a difference value between the downlink channel estimation value and a previous downlink channel estimation value; and transmitting the first uplink original reference signal and the encoded second uplink original reference signal back to the base station.

11. The method of claim 10, further comprising:
generating a pre-coding matrix comprising the downlink channel estimation value; and
generating the encoded second uplink original reference signal by multiplying the second uplink original reference signal by the pre-coding matrix.

12. The method of claim 10, further comprising:
obtaining the downlink channel estimation value and information of downlink reference signal configuration according to a downlink reference signal from the base station; and
reporting the information of downlink reference signal configuration to the base station.

13. The method of claim 12, wherein the information of downlink reference signal configuration comprises a quantity of downlink channels, a corresponding physical cell identity (PCI) value of each of the downlink channels, and a corresponding antenna port of each of the downlink channels.

14. The method of claim 12, further comprising:
estimating a downlink channel noise according to the downlink reference signal; and
obtaining the downlink channel estimation value according to the downlink reference signal, a downlink original reference signal corresponding to the downlink reference signal, and the downlink channel noise.

15. The method of claim 10, wherein the information of uplink reference signal configuration comprises a value of the first uplink original reference signal and a value of the second uplink original reference signal.

16. A wireless communication system, comprising:
a first base station configured to: receive a first uplink reference signal and a second uplink reference signal;
obtain an uplink channel estimation value according to the first uplink reference signal; and
obtain a downlink channel estimation value according to the uplink channel estimation value and the second uplink reference signal; and further comprising: a second user device not served by the first base station; wherein the first base station is further configured to: receive another first uplink reference signal and another second uplink reference signal from the second user device;

obtain another uplink channel estimation value according to the another first uplink reference signal; and obtain another downlink channel estimation value according to the another uplink channel estimation value and the another second uplink reference signal;

a first user device configured to: in response to information of uplink reference signal configuration from the first base station, generate a first uplink original reference signal and a second uplink original reference signal;

pre-code the second uplink original reference signal with the downlink channel estimation value or a downlink channel variation value to generate an encoded second uplink original reference signal, the encoded second uplink original reference signal being a difference value between the downlink channel estimation value and a previous downlink channel estimation value;

transmit the first uplink original reference signal, so that the first base station receives the first uplink reference signal; and transmit the encoded second uplink original reference signal, so that the first base station receives the second uplink reference signal.

17. The wireless communication system of claim 16, wherein the first user device is further configured to:

generate a pre-coding matrix comprising the downlink channel estimation value; and multiply the second uplink original reference signal by the pre-coding matrix to generate the encoded second uplink original reference signal.

18. The wireless communication system of claim 16, wherein the first base station is further configured to:

receive information of downlink reference signal configuration from the first user device, the information of downlink reference signal configuration comprising a quantity of downlink channels, a corresponding physical cell identity (PCI) value of each of the downlink channels, and a corresponding antenna port of each of the downlink channels.

19. The wireless communication system of claim 18, further comprising:

a second base station;

wherein the first base station is further configured to negotiate, according to the information of downlink reference signal configuration, with the second base station for a transmission configuration of the second uplink reference signal.

20. The wireless communication system of claim 19, wherein the first user device is further configured to:

receive another downlink reference signal from the second base station;

obtain another downlink channel estimation value corresponding to the second base station according to the another downlink reference signal;

generate a pre-coding matrix comprising the downlink channel estimation value and the another downlink channel estimation value; and multiply the second uplink original reference signal by the pre-coding matrix to generate the encoded second uplink original reference signal.

21. The wireless communication system of claim 16, wherein the information of uplink reference signal configuration comprises a value of the first uplink original reference signal and a value of the second uplink original reference signal.

* * * * *